(12) United States Patent
Ehrlich et al.

(10) Patent No.: US 8,632,078 B2
(45) Date of Patent: Jan. 21, 2014

(54) VEHICLE WITH A LEAF SPRING ELEMENT FOR THE SPRING SUSPENSION OF THE VEHICLE

(75) Inventors: Dirk Ehrlich, Ruesselsheim (DE); Richard Starck, Falkenstein (DE); Veit Held, Bensheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/338,299

(22) Filed: Dec. 28, 2011

(65) Prior Publication Data

US 2012/0161411 A1    Jun. 28, 2012

(30) Foreign Application Priority Data

Dec. 28, 2010    (DE) .......................... 10 2010 056 388

(51) Int. Cl.
*B60G 11/34*    (2006.01)

(52) U.S. Cl.
USPC ............ 280/5.515; 280/124.17; 280/124.171; 280/124.175; 280/5.514

(58) Field of Classification Search
USPC ...................... 280/124.17, 124.175, 124.171, 280/124.173, 5.514, 5.515
See application file for complete search history.

(56) References Cited

U.S. PATENT DOCUMENTS

| 1,336,481 | A | * | 4/1920 | Nettenstrom | 267/244 |
| 3,041,086 | A | * | 6/1962 | Walker | 280/124.111 |
| 3,053,548 | A | * | 9/1962 | Moore | 280/124.101 |
| 3,170,712 | A | * | 2/1965 | Hildebrandt et al. | 280/6.15 |
| 3,462,169 | A | * | 8/1969 | Carter | 280/6.16 |
| 3,606,376 | A | * | 9/1971 | Hickman | 280/124.165 |
| 3,850,444 | A | * | 11/1974 | Wright et al. | 280/124.165 |
| 4,854,606 | A | * | 8/1989 | de Goncourt et al. | 280/124.14 |
| 4,858,950 | A | * | 8/1989 | Kajiwara et al. | 280/6.15 |
| 4,903,984 | A | * | 2/1990 | Kajiwara et al. | 280/5.515 |
| 4,997,202 | A | * | 3/1991 | Kitagawa et al. | 280/124.14 |
| 5,007,660 | A | * | 4/1991 | Orndorff et al. | 280/124.102 |
| 5,016,861 | A |   | 5/1991 | Thompson et al. |   |
| 5,058,918 | A | * | 10/1991 | Nakaya et al. | 280/124.136 |
| 5,141,209 | A | * | 8/1992 | Sano et al. | 267/36.1 |
| 5,172,930 | A | * | 12/1992 | Boye et al. | 280/6.157 |

(Continued)

FOREIGN PATENT DOCUMENTS

| DE | 3105383 A1 | 9/1982 |
| DE | 3637281 A1 | 1/1988 |

(Continued)

OTHER PUBLICATIONS

UK IPO, British Search Report for Application No. 1120859.2, dated Mar. 26, 2012.

(Continued)

*Primary Examiner* — Nicole Verley
(74) *Attorney, Agent, or Firm* — Ingrassia Fisher & Lorenz, P.C.

(57) ABSTRACT

A vehicle, such as a passenger car, is provided with a vehicle frame having a leaf spring element for the spring suspension of the vehicle, which is mounted on the vehicle frame with two bearing points, which are designed in a manner to adjustably set a spring rate and/or a standing height of the leaf spring element. The leaf spring element is mounted on a frame of the vehicle with the two bearing points and the bearing points are designed adjustable for setting a spring rate and/or a standing height of the leaf spring element.

20 Claims, 4 Drawing Sheets

(56) References Cited

U.S. PATENT DOCUMENTS

| | | | |
|---|---|---|---|
| 5,251,930 A * | 10/1993 | Kusaka et al. | 280/124.14 |
| 5,390,949 A * | 2/1995 | Naganathan et al. | 280/5.515 |
| 6,189,904 B1 * | 2/2001 | Gentry et al. | 280/124.175 |
| 6,273,441 B1 * | 8/2001 | Neavitt et al. | 280/124.174 |
| 6,367,831 B1 * | 4/2002 | Lim et al. | 280/124.102 |
| 6,371,466 B1 | 4/2002 | Spears | |
| 6,378,881 B2 * | 4/2002 | Stenvall | 280/124.171 |
| 6,406,007 B1 * | 6/2002 | Wilson | 267/36.1 |
| 6,457,729 B2 * | 10/2002 | Stenvall | 280/124.134 |
| 6,616,557 B2 * | 9/2003 | Tsuruta et al. | 474/111 |
| 6,951,343 B2 * | 10/2005 | Hildebrand | 280/124.175 |
| 7,360,778 B2 * | 4/2008 | Smith | 280/124.17 |
| 7,475,883 B2 * | 1/2009 | Christophel et al. | 280/5.514 |
| 7,931,287 B2 * | 4/2011 | Dudding et al. | 280/124.175 |
| 7,950,678 B1 * | 5/2011 | Bauder | 280/43.18 |
| 8,360,454 B2 * | 1/2013 | Fruhmann et al. | 280/124.175 |
| 2003/0080527 A1 * | 5/2003 | Bryant | 280/124.175 |
| 2007/0075513 A1 * | 4/2007 | Caron | 280/124.1 |

FOREIGN PATENT DOCUMENTS

| | | | | |
|---|---|---|---|---|
| DE | 19542108 A1 | | 5/1996 | |
| EP | 337488 A2 * | | 10/1989 | B60G 11/08 |
| EP | 1155884 A2 | | 11/2001 | |
| JP | 03186482 A * | | 8/1991 | B62D 7/14 |
| JP | 03193516 A * | | 8/1991 | B60G 11/10 |
| JP | 05301510 A * | | 11/1993 | B60G 21/05 |

OTHER PUBLICATIONS

German Patent Office, German Search Report for Application No. 102010056388.9, dated Oct. 5, 2011.

* cited by examiner

US 8,632,078 B2

VEHICLE WITH A LEAF SPRING ELEMENT FOR THE SPRING SUSPENSION OF THE VEHICLE

CROSS-REFERENCE TO RELATED APPLICATION

This application claims priority to German Patent Application No. 102010056388.9, filed Dec. 28, 2010, which is incorporated herein by reference in its entirety.

TECHNICAL FIELD

The technical field relates to a vehicle with a leaf spring element for the spring suspension of the vehicle.

BACKGROUND

In DE 195 42 108 A1, an independent wheel suspension for the wheels of a motor vehicle is described. The independent wheel suspension described comprises a transverse leaf spring extending from wheel to wheel the free ends of which in each case are articulated on wheel carriers of the wheels via ball joints. The transverse leaf spring is supported on the vehicle body via two symmetrical bearing points arranged outside the middle of the axle. Furthermore, the transverse leaf spring is supported in the vertical direction, which is in upper direction by a level-controlling actuator acting on said transverse leaf spring, which actuator in itself is not of a spring type. The actuator described there only allows a limited level control.

A spring shackle fastened to a frame of a chassis is described in DE 36 37 281 A1. The spring shackle is equipped with elastic support bearings arranged spaced from one another in longitudinal direction of a leaf spring to be supported. The support bearings act together with a spring end of the leaf spring. Furthermore, a progressively acting spring suspension for vehicles where the spring hardness of leaf spring packages adapts itself automatically to the respective load is described in DE 31 05 383 A1. A leaf spring package in this case has a guide leaf mounted on the vehicle frame and a spring leaf of larger width arranged below the former. In addition, support pairs with rolling-off surfaces are fastened on the vehicle. In the unloaded or already loaded state of the vehicle, no contact of the leaf spring package with the rolling-off surfaces takes place. When the load increases, the spring leaf rolls off the rolling-off surfaces of the two support pairs. The effective spring length of the spring leaf is shortened and the spring suspension is stiffened. Such leaf spring pairs require additional installation space.

In view of the foregoing, at least one object is to provide a vehicle with an improved spring suspension. In addition, other objects, desirable features, and characteristics will become apparent from the subsequent summary and detailed description, and the appended claims, taken in conjunction with the accompanying drawings and this background.

SUMMARY

A vehicle, such as a passenger car, is provided having a vehicle frame, with a leaf spring element for the spring suspension of the vehicle, which is mounted on the vehicle frame by means of two bearing points, which are designed in such a manner to adjustably adjust a spring rate and/or a standing height of the leaf spring element. The leaf spring element is mounted on a frame of the vehicle by means of two bearing points and the bearing points are adjustably designed for adjusting a spring rate and/or a standing height of the leaf spring element.

The bearing points are designed for a leaf spring element of a wheel suspension moveable. The spring rate and/or the standing height of the leaf spring element can be adjusted and varied, for example, dependent on at least one factor, such as for example the vehicle speed, the vehicle load, the vehicle characteristic (sport, basic, comfort) etc.

The leaf spring element can be a transverse leaf spring element, which is employed on a vehicle axle, for example the rear axle, for a rear wheel suspension. Up to now, coil springs or air springs are employed. However, coil springs require additional installation space. Air springs in turn are expensive and have therefore only succeeded with vehicles in the luxury class. By using a leaf spring element, such as for example a transverse leaf spring element, less installation space than is needed as compared with a conventionally used coil spring.

In embodiments, the standing height of the leaf spring element is designed adjustably in order to be able to compensate for different load states or in order to adjust the vehicle higher dependent on speed, for example on poor road sections, or lower, for example when traveling on motorways. With an adjustable leaf spring element it is advantageously possible to react to different load conditions of a vehicle. Thus, the spring can be set stiffer with increasing load and the body natural frequency can be kept constant. Thus, a desired harder spring characteristic curve can be created for example. The spring rate can also be adjusted softer or stiffer independently of this, depending on function and operating purpose.

Furthermore, it is possible with a height adjustment to return the loaded vehicle into a starting position or for example when traveling on a motorway, to lower the vehicle in order to lower the air resistance and thus the fuel consumption. The spring rate and/or the height adjustment can be specifically adapted in order to achieve a desired vehicle character, e.g. a sport setting or a comfort setting of the vehicle. Thus, the height adjustment of the vehicle can be made for example as a function of load and/or speed.

In an embodiment, the bearing points are designed moveable in horizontal direction based on the vehicle. The bearing points are more preferably moveable independently of one another in horizontal direction based on the vehicle, more preferably towards one another and away from one another. The spring rate and the standing height of the leaf spring element can be specifically adjusted as required and the leaf spring element can be adjusted, for example, soft or hard.

In a further embodiment, the bearing points are designed moveable jointly or independently of one another in a vertical direction based on the vehicle. The standing height of the leaf spring element can be adjusted or varied.

In a further embodiment, the bearing points are moveable at an angle to a horizontal based on the vehicle. The bearing points are more preferably designed moveable towards one another or away from one another independently of one another, more preferably at the angle to the horizontal. Thus, the spring rate and the standing height of the leaf spring element can be likewise adjusted.

According to a further embodiment, a drive is provided via which each of the bearing points is designed moveable individually or at least two bearing points jointly. A common drive has the advantage that it is particularly cost-effective. A separate drive each for each bearing point in turn allows moving and adjusting the bearing point independently of the other bearing point.

In another embodiment, each of the bearing points is designed moveable in horizontal direction based on the vehicle via a separate drive. In addition, the bearing points are designed moveable in vertical direction based on the vehicle via an additional common drive. The spring rate and the standing height of the leaf spring element can be adjusted in a particularly differentiated manner.

In a further embodiment, at least one drive comprises a Watt linkage. The Watt linkage is connected to the bearing points via rods in an articulated manner. The two bearing points can, for example, be moved with one drive via the Watt linkage.

According to a further embodiment, at least one drive comprises a control cable. The control cable is connected with one or both bearing points for moving the bearing points. The control cable makes possible that both bearing points can be moved with the control cable via a drive.

In a further embodiment, a bearing point is coupled to a resetting spring element. In the case of a failure of a drive for the bearing point, this resetting spring element can then move the bearing point into a defined position and thus ensure a higher failure safety.

In a further embodiment, the spring rate and/the adjustment of the standing height of the leaf spring element (height adjustment) is adjustable dependent on speed and/or dependent on load. The standing height of the leaf spring element can be reduced at high speed, for example on a motorway, so that the vehicle floor is shifted closer in the direction of the road surface, as a result of which the road holding can be improved and the fuel consumption reduced. In the case of a heavily loaded vehicle, the spring rate for example can be adjusted so that the leaf spring element is stiffer for example.

In a further embodiment, at least one bearing point comprises a spring support, which is designed for changing the progressiveness of the spring characteristic curve of the leaf spring element. The spring support can for example be designed as roller. The spring support can preferentially have an elastic material or have such a material, more preferably hard rubber or rubber and/or polyurethane.

In a further embodiment, the leaf spring element has a metal, a metal alloy and/or of plastic, more preferably glass fiber-reinforced plastic or carbon fiber-reinforced plastic. Typically, the leaf spring element is designed as a transverse leaf spring element or as a longitudinal leaf spring element.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
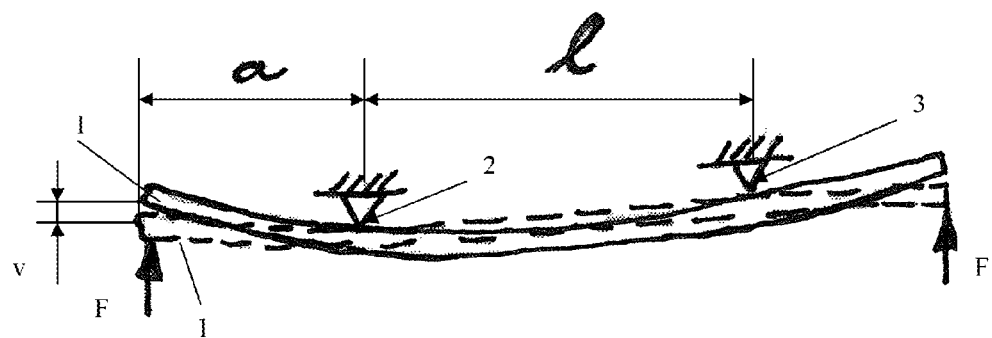
FIG. 1 is a schematic view of a single-layer leaf spring element and a mounting.

FIG. 1 shows a schematic view of a single-layer leaf spring element 1, which has a constant spring rate or spring stiffness c. The spring element 1 in this case has two bearing points 2, 3 which have a distance 1 from each other. The one free end of the leaf spring element 1 in this case forms a lever arm a with the associated bearing point 2. The free end of the leaf spring element 1 is displaced by a distance v, when a force F acts on the free end of the leaf spring element 1. The spring rate or spring stiffness c of the leaf spring element 1 is dependent on the modulus of elasticity E, the resistance moment I, the lever length a and the support base 1, where:

$$v = \frac{F \cdot a^2 \cdot (l+a)}{3 \cdot E \cdot I} \text{ and } c = \frac{F}{v} = \frac{3 \cdot E \cdot I}{a^2 \cdot (l+a)}$$

Figure 2:
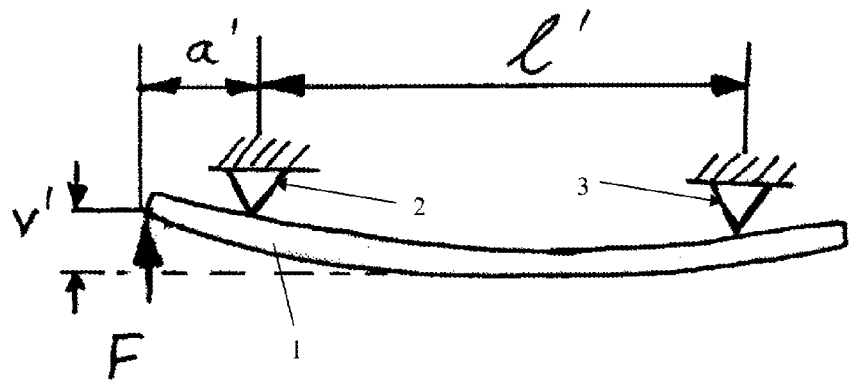
FIG. 2 shows the leaf spring element according to FIG. 1 with the spring rate c' of the leaf spring element is changed.

FIG. 2 shows the leaf spring element 1 according to FIG. 1, where the leaf spring stiffness c of the leaf spring element is changed. According to embodiments, a leaf spring element 1 is provided with a progressive spring characteristic curve.

With previous leaf springs, a progressive spring characteristic curve is achieved with additional spring layers, which come into effect via the spring travel. However, this increases the mass of the spring and brings with it additional costs. Furthermore, the spring becomes thicker which requires more installation space and is more involved regarding manufacture and assembly. For this reason, the spring support of the leaf spring element 1 according to embodiments is designed so that the effective lever arm a is shortened via the spring compression travel and the spring rate c thus increased.

In order to change the leaf spring stiffness of the leaf spring element 1 the lever length a is changed to a' and the support width l into l'. I.e., the lever length a is reduced and the support width l is increased. This produces a greater spring stiffness c', where:

$$c' = \frac{F}{v'} = \frac{3 \cdot E \cdot J}{a'^2 \cdot (l' + a')} \text{ with } a' < a \text{ and } l' > l$$

which produces c'>c.

Figure 3:
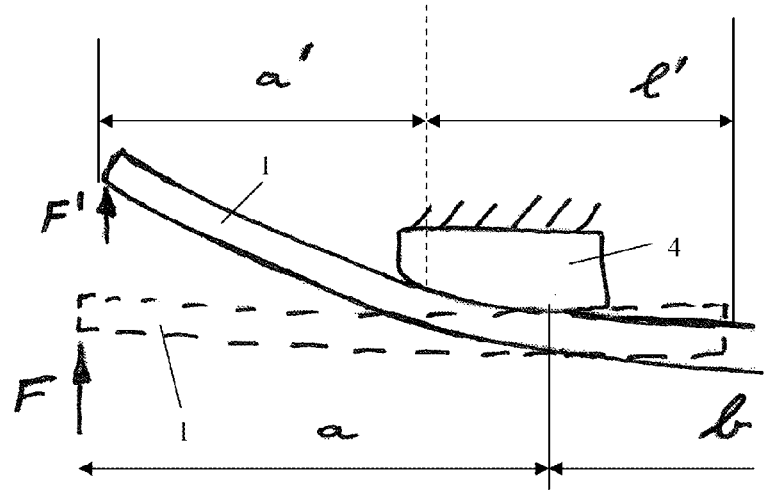
FIG. 3 is a schematic view of a leaf spring element with a mounting, which results in an increase of the spring rate c' under a load F'.

FIG. 3 shows the mounting of a leaf spring element 1, which leads to an increase of the spring rate c' under the load F'. The progressiveness of the spring characteristic curve can be changed with the shape of the spring support 4. The spring support 4 is coated for example with an elastic material such as rubber, polyurethane (PU) or a similar elastic or insulating material in order to keep a noise transmission into a vehicle interior as low as possible.

As spring material for the leaf spring element 1, metal, e.g. spring steel, and/or plastic, e.g. glass fiber-reinforced plastic (GRP), carbon fiber-reinforced plastic (CRP) etc. can be used for example. Plastic has the advantage that it has a particularly low weight. The spring support 4 can be additionally designed protected against accumulation of dirt and small stones.

The leaf spring element 1 can be installed in the vehicle both transversely, as transverse leaf spring element, or longitudinally, i.e., as longitudinal leaf spring element. The leaf spring element 1 can for example be provided in a twist beam axle or in another axle system such as for example a four-link axle, a five-link axle, or a linked H-arm axle.

As is shown by means of the exemplary embodiments in the FIG. 4 to FIG. 9 in the following, the bearing point 2, 3 or the spring support 4 of the bearing point 2, 3 of the leaf spring element 1 is designed adjustably according to the invention. The leaf spring element 1 shown in FIG. 4 to FIG. 9 is part of a wheel suspension for wheels 5 of a vehicle 6, for example, for the rear wheels or front wheels. The leaf spring element 1 in this case is installed, for example, transversely to the longitudinal axis of the vehicle 6 and acts as transverse leaf spring element. Likewise, the leaf spring element can also be installed longitudinally in the vehicle 6 and act as longitudinal leaf spring element (not shown). The representation in FIG. 4 to FIG. 9 is greatly simplified and purely schematic. For the sake of clarity the connection or coupling of the leaf spring element 1 to the respective wheel 5 is not shown.

Figure 4:
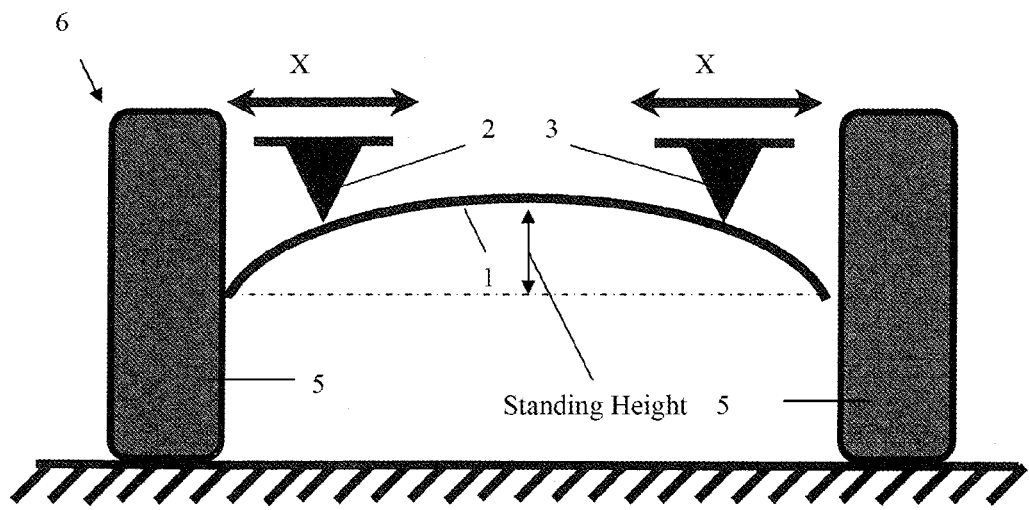
FIG. 4 is a schematic view of the adjustment of a spring support of a leaf spring element according to a first embodiment.

FIG. 4 shows a schematic view of a leaf spring element 1, which is part of a wheel suspension for wheels 5 of a vehicle 6. The leaf spring element 1, in this case a transverse leaf spring element, comprises two bearing points 2, 3, with which the leaf spring element is mounted on the vehicle. Each bearing point 2, 3 has a spring support for the leaf spring element 1.

With this first embodiment, the two bearing points 2, 3 of the leaf spring element 1 are designed displaceable in horizontal direction based on the vehicle. The bearing points 2, 3 are displaced in opposite direction, i.e. the bearing points can be pushed apart or together, as is indicated with arrows X in FIG. 3. Through the displacement of the bearing points 2, 3 and thus their spring supports for the leaf spring element in horizontal and opposite direction, the change of the standing height of the body and the body natural frequency, i.e., the stiffness of the spring, can be coupled. The displacement of the bearing points 2, 3 and their spring bearings can for example be realized with the following drive variants shown in FIG. 8 and FIG. 9. Thus, with the first embodiment, as is shown in the exemplary embodiment in FIG. 4, the bearing points 2, 3 and their spring bearings can be moved with two drives or with one drive having a Watt linkage and/or a control cable.

Figure 5:
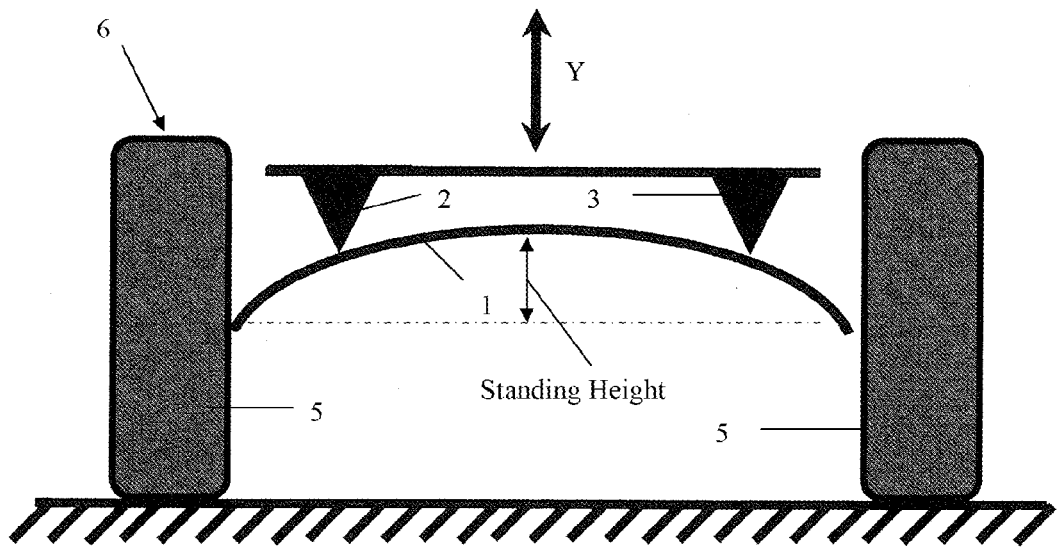
FIG. 5 is a schematic view of the adjustment of a spring support of a leaf spring element according to a second embodiment.
Figure 6:
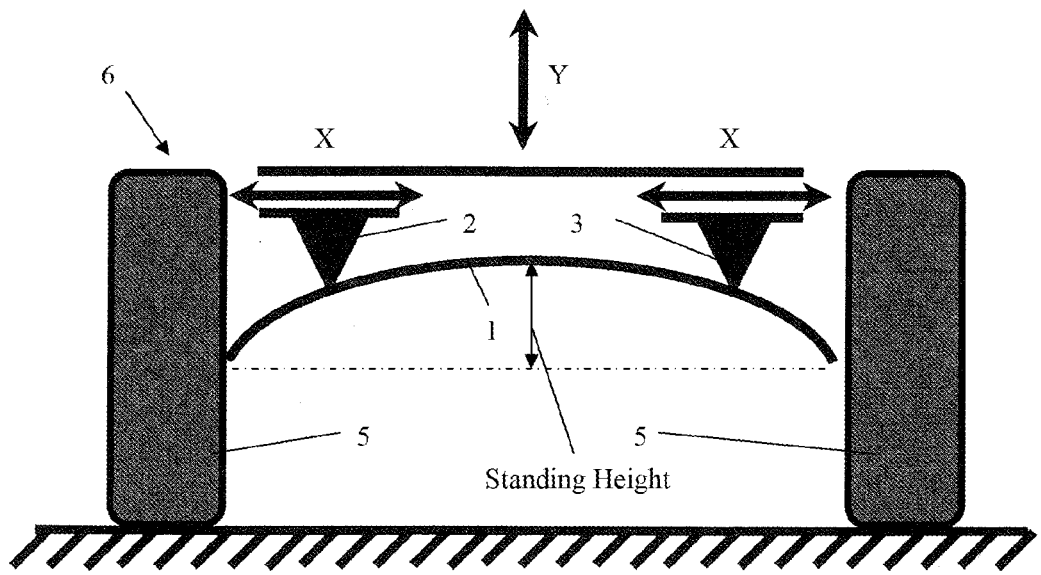
FIG. 6 is a schematic view of the adjustment of a spring support of a leaf spring element according to a third embodiment.

FIG. 5 likewise shows a schematic view of a leaf spring element 1, for example a transverse leaf spring element, which is part of a wheel suspension of wheels 5 of a vehicle 6. There, two bearing points 2, 3 are provided, with which the leaf spring element 1 is mounted on the vehicle 6. With the second embodiment, the two bearing points 2, 3 of the leaf spring element 1 are designed displaceable in vertical direction based on the vehicle, as is indicated with the arrow Y in FIG. 5. The bearing points 2, 3 are connected to each other for example and are displaced in the same direction. This means that the bearing points 2, 3 are designed adjustable in vertical direction to the top and to the bottom, as is indicated by the arrow Y in FIG. 5. Thus, the standing height of the body of the vehicle 6 is changed. The displacement of the bearing points 2, 3 and their spring bearings with the second embodiment can be carried out for example by a drive. FIG. 6 shows a schematic view of a further leaf spring element 1, for example, a transverse leaf spring element, which has two bearing points 2, 3 with which the leaf spring element is mounted on the vehicle 6 and connected or coupled to wheels 5 of the vehicle.

In the third embodiment, the bearing points 2, 3 of the leaf spring element 1 are designed adjustable in the same and vertical direction based on the vehicle, as is indicated with an arrow Y in FIG. 6. In other words, the bearing points 2, 3 are connected to each other and are designed displaceable perpendicularly to the vehicle. Independently, the bearing points 2, 3 of the leaf spring element 1 are additionally designed displaceable in horizontal direction based on the vehicle and in opposite direction, as is indicated with arrows X in FIG. 6. Therefore, the standing height of the body and the body natural frequency can be influenced independently of each other. The displacement of the bearing points 2, 3 and their spring bearings with a third embodiment can for example be carried out by three drives or two drives, wherein for example in the case of two drives, one or both drives can have a Watt linkage and/or a control cable. Exemplary embodiments for drive variants with a Watt linkage and a control cable are shown in the following FIG. 8 and FIG. 9.

Figure 7:
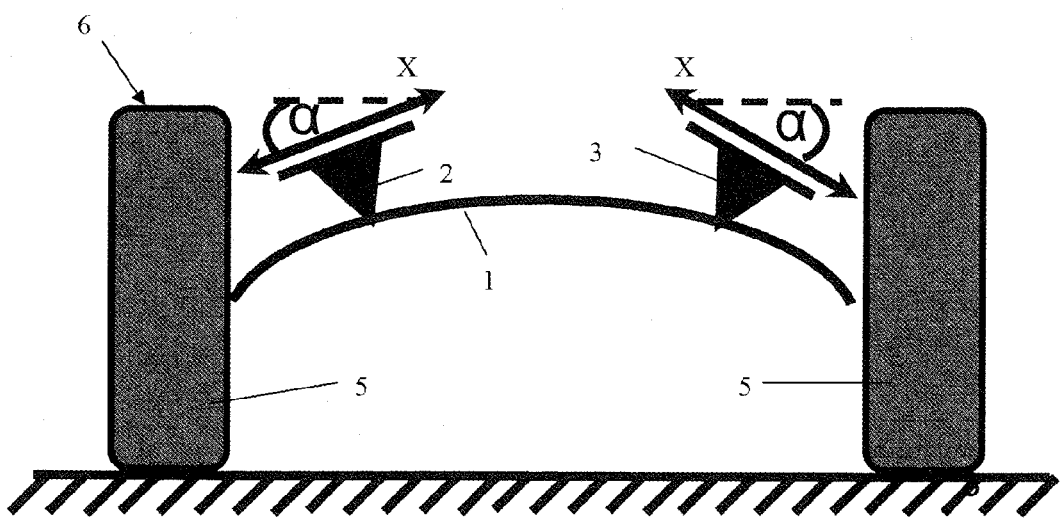
FIG. 7 is a schematic view of the adjustment of a spring support of a leaf spring element according to a fourth embodiment.

FIG. 7 shows a schematic view of another leaf spring element 1, for example, a transverse leaf spring element, which comprises two bearing points 2, 3, with which the leaf spring element 1 is mounted on the vehicle and connected or coupled to wheels 5. As is shown in the fourth embodiment of the invention in FIG. 7, the bearing points 2, 3 are designed displaceable or moveable to a horizontal based on the vehicle at an angle α, as is indicated with arrows X in FIG. 7, in order to achieve a coupling of standing height change and change of the body natural frequency.

As a special case, the angle α can be selected so that only the body natural frequency is influenced. The displacement of the bearing points 2, 3 and their spring bearings with the fourth embodiment can for example be carried out by two drives or one drive. In the case of one drive, the drive for example has a Watt linkage and/or a control cable. The drive or the drives, which are employed in the first, second, third and fourth embodiment can, for example, be carried out electromechanically, pneumatically and/or hydraulically.

Figure 8:
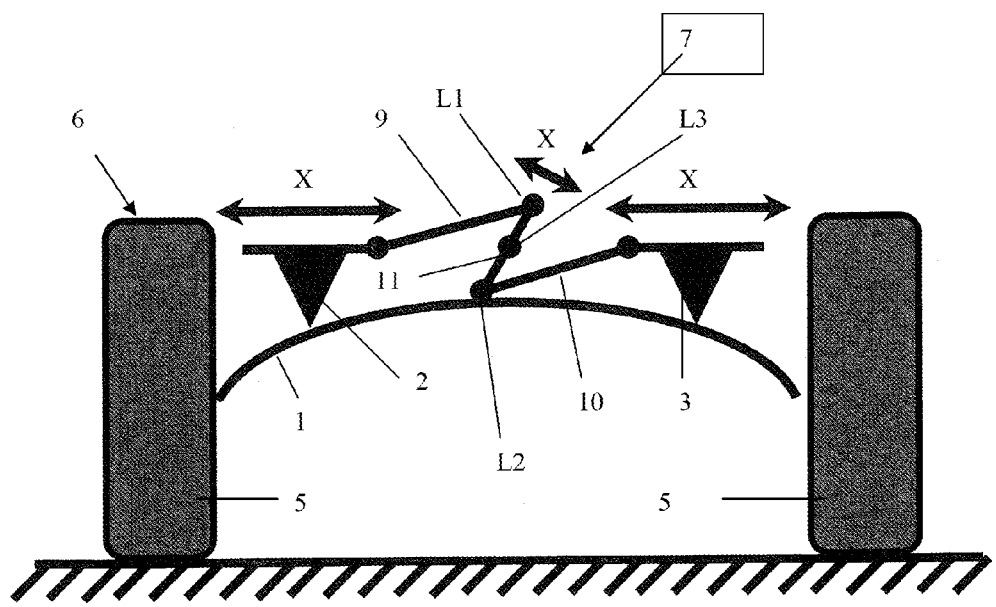
FIG. 8 is a schematic view of an exemplary embodiment of a drive with a Watt linkage for moving bearing points of a leaf spring element.

FIG. 8 shows an example of a drive 7 having a Watt linkage 8, for moving or displacing two bearing points 2, 3 and their spring bearings, which mount a leaf spring element 1. The leaf spring element 1 is connected or coupled to two wheels 5 of a vehicle 6. With a Watt linkage 8, the movement of a point on a circular path section is converted into a movement on a lemniscate.

With the exemplary embodiment shown in FIG. 7, the Watt linkage 8 comprises a first and second rod 9, 10, which with their one end are each connected to an associated bearing point 2, 3. With their other end L1, L2, the two rods 9, 10 in turn are rotatable connected to a third or middle rod 11. The end points L1, L2 of the first and second rod 9, 10 of the Watt linkage 8 move on a circular path. The middle rod 11, which is connected to the two end points L1, L2 of the two rods 9, 10 has the point L3 in the middle. This point L3 moves on a lemniscate. Via the Watt linkage 8, the bearing points 2, 3 and their spring bearings can be displaced or moved in horizontal and in opposite direction, as is indicated by the arrows X in FIG. 8.

Figure 9:
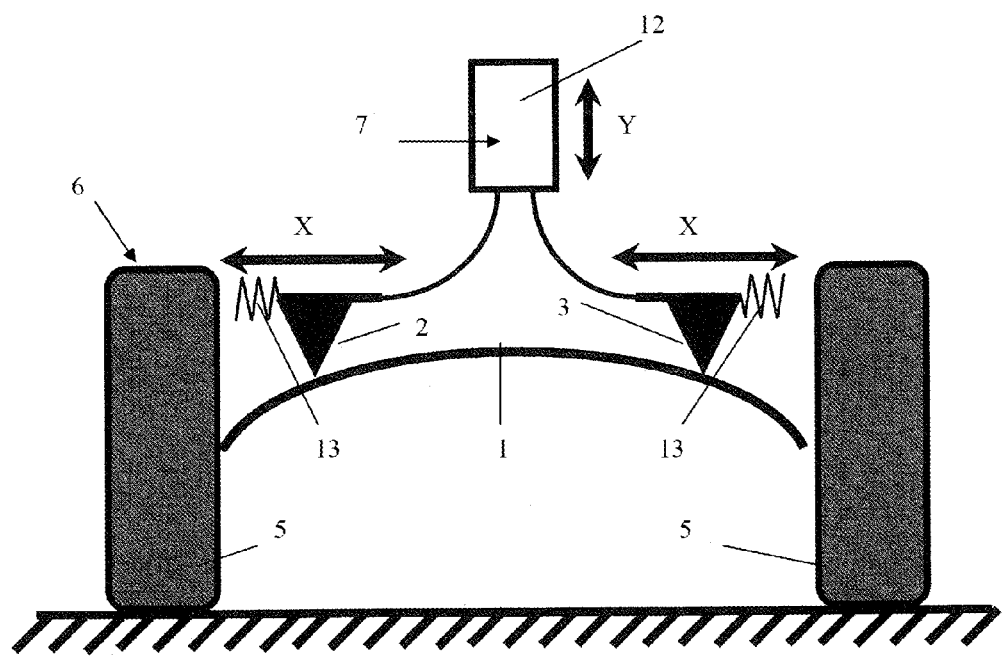
FIG. 9 is a schematic view of a further exemplary embodiment of a drive with a control cable, for moving bearing points of a leaf spring element.

In FIG. 9, an example of a drive 7 having a control cable 12 is additionally shown, for moving or displacing two bearing points 2, 3 and their spring bearings, which mount a leaf spring element 1. As is shown in the exemplary embodiment in FIG. 9, the two bearing points 2, 3 and their spring bearings mount a leaf spring element 1, which is connected or coupled to two wheels 5 of a vehicle 6. The bearing points 2, 3 in this case are each connected to the control cable 12 in order to be displaced in horizontal and in opposite direction.

With the drive variant having a control cable 12, each of the bearing points 2, 3 can be additionally designed coupled to a retraction spring element 13. The retraction spring elements 13 in this case are arranged in such a manner that the spring support of the leaf spring element 1 at the associated bearing point 2, 3 moves into a practical defensive position in the event of an energy failure. As is shown in the exemplary embodiment in FIG. 9, this defensive position can for example be the outer position (stiff spring) or the inner position (soft spring) of the leaf spring element (not shown). The respective retraction spring element 13 in the exemplary embodiment in FIG. 9 is coupled to the associated bearing point 2, 3 in such a manner, that the retraction spring element 13 pulls the bearing point 2, 3 for example to the outside or into an outer position, which provides a stiffer leaf spring element 1. Likewise, the retraction spring elements 13 can be coupled to the bearing points 2, 3 in such a manner that the retraction spring element 12 pulls the associated bearing point 2, 3 to the inside or into an inner position. In this case, a softer leaf spring element 1 is provided.

The adjustment of setting of the spring rate of the leaf spring element 1, as was previously described by means of the exemplary embodiments in FIG. 4 to FIG. 9, has the following advantage among others. The adjustability of the spring rate can be used in order to increase the spring rate with increasing load for example. Thus, a desired harder spring characteristic curve can be created.

Springs with progressive spring characteristic curve have been employed in commercial vehicles and passenger cars for some time in order to achieve a constant body natural frequency with increasing load of the vehicle. A constant body natural frequency is important for driving comfort. Thus, a natural frequency that is too low, for example <1 Hz, leads to travel sickness. A natural frequency that is too high, for example >1.8 Hz, in turn generates high accelerations in vehicle Z-direction. The vehicle is jerky and road irregularities are transmitted to the occupants.

With respect to the safety, a natural frequency that is too high, for example >1.8 Hz, can often result in the wheel lifting off the road, as a result of which the wheel is no longer able to transmit any forces. This is highly problematic. Today, coil springs with progressive characteristic curve in barrel shape are therefore used.

A further possibility is the use of a spring with linear characteristic curve and involvement of an additional spring. The contact with the additional spring can however be noticed by the vehicle occupants and possibly be perceived uncomfortable. A further possibility of achieving a progressive spring characteristic curve is the use of an air spring. However, this system is relatively expensive and can only be found in luxury class passenger cars.

An advantage of the adjustment or setting of the spring rate of the leaf spring element 1 is that a load and/or speed-dependent height adjustment of the vehicle 6 is made possible. With load and/or in trailer mode, the vehicle drops and can be raised again. This has the advantage that a higher so-called residual spring travel up to a buffer block can be achieved. Because of this, the comfort can be increased. Today, this can be achieved through an air spring or through a Nivomat shock absorber. However, an air spring is expensive and a Nivomat cannot directly influence the spring rate. With a speed-dependent height adjustment, the vehicle 6 can be additionally lowered for example on the motorway in order to reduce the air resistance and thus the fuel consumption. On a poor road, the vehicle can be raised in order to achieve greater ground clearance.

The aforementioned possibilities can also be applied combined with one another, in order to specifically change the vehicle character (e.g., sport or comfort setting). Here, the spring rate of the leaf spring element can for example be adjusted or varied with one or a plurality of actuators while driving. In addition or alternatively, the spring rate of the leaf spring element can for example be adjusted also in a service workshop, for example, hard with a sportive driving style, medium in the case of a normal driving style and soft when driving in the vehicle is to be rather comfort-oriented.

The bearing points 2, 3 or their spring supports are, for example, designed as rollers. These rollers are coated for example with a damping material such as rubber, polyurethane (PU) or a similar, insulating material in order to keep a noise transmission into a vehicle interior as low as possible. As spring material for the leaf spring element 1, a metal, such as for example spring steel and/or plastic, such as for example GRP, CRP etc. can be employed. The leaf spring element can be arranged as transverse leaf spring element for example transversely in the vehicle or as longitudinal leaf spring element, longitudinally in the vehicle.

The size of the drive 7 for moving and adjusting the bearing points 2, 3 for the leaf spring element 1 is for example dependent on the desired adjusting speed. The higher the desired adjusting speed, the greater the required power for the drives for adjusting the bearing points and thus for adjusting the leaf spring element. In order to keep the power consumption and thus the load on the electric on-board system, the mass of the adjusting unit and the required space within limits, a low or rather low adjusting speed of the drive can be provided for example.

Although the embodiments were completely described above with preferred exemplary embodiments, it is not restricted to these, but can be modified in a highly versatile manner. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A vehicle, comprising:
   a vehicle frame;
   at least two bearing points;
   a leaf spring element for a spring suspension of the vehicle that is mounted on the vehicle frame with the at least two bearing points; and
   at least one drive connected to the at least two bearing points, the at least one drive configured to adjustably set a parameter of the leaf spring element by adjusting a position of at least one of the at least two bearing points in a horizontal direction.

2. The vehicle according to claim 1, wherein the parameter is a spring rate.

3. The vehicle according to claim 1, wherein the parameter is a standing height.

4. The vehicle according to claim 1,
wherein the at least two bearing points based on the vehicle are independently adjustable in the horizontal direction, and
wherein the at least two bearing points are moveable in the horizontal direction towards each other and away from each other.

5. The vehicle according to claim 1, wherein the at least two bearing points based on the vehicle are moveable in a vertical direction.

6. The vehicle according to claim 1,
wherein the at least two bearing points are independently movable at an angle to a horizontal, and
wherein the at least two bearing points are moveable at the angle to the horizontal.

7. The vehicle according to claim 1, wherein the at least two bearing points are jointly moveable via the drive.

8. The vehicle according to claim 1, wherein each of the at least two bearing points based on the vehicle is moveable in horizontal direction via a separate drive and the at least two bearing points based on the vehicle are moveable in vertical direction via an additional common drive.

9. The vehicle according to claim 8,
wherein at least one drive comprises a Watt linkage, and
wherein the Watt linkage is connected to the at least two bearing points in an articulated manner via rods.

10. The vehicle according to claim 7, wherein the at least one drive comprises a control cable configured to move the at least two bearing points that is connected to at least one of the at least two bearing points.

11. The vehicle according to claim 8, wherein at least one drive is a pneumatic drive.

12. The vehicle according to claim 8, wherein at least one drive is an electromechanical drive.

13. The vehicle according to claim 8, wherein at least one drive is a hydraulic drive.

14. The vehicle according to claim 1, further comprising a resetting spring element coupled to at least one bearing point of the at least two bearing points.

15. The vehicle according to claim 1, wherein the leaf spring element and the at least two bearing points are configured to adjust the parameter of the leaf spring element dependent on a vehicle characteristic dependent on a vehicle speed.

16. The vehicle according to claim 1, wherein the leaf spring element and the at least two bearing points are configured to adjust the parameter of the leaf spring element dependent on a vehicle characteristic dependent on a vehicle load.

17. The vehicle according to claim 1, wherein at least one bearing point comprises a spring support configured to change a progressiveness of a spring characteristic curve of the leaf spring element.

18. The vehicle according to claim 17,
wherein the spring support is a roller, and
wherein the spring support comprises an elastic material.

19. The vehicle according to claim 18, wherein the elastic material is polyurethane.

20. The vehicle according to claim 1, wherein the leaf spring element comprises a metal.

* * * * *